Dec. 4, 1962     H. J. MOORE     3,066,457
TOOL GRINDING MACHINE FIXTURE AND METHOD OF USING SAME
Filed July 24, 1961     2 Sheets-Sheet 1
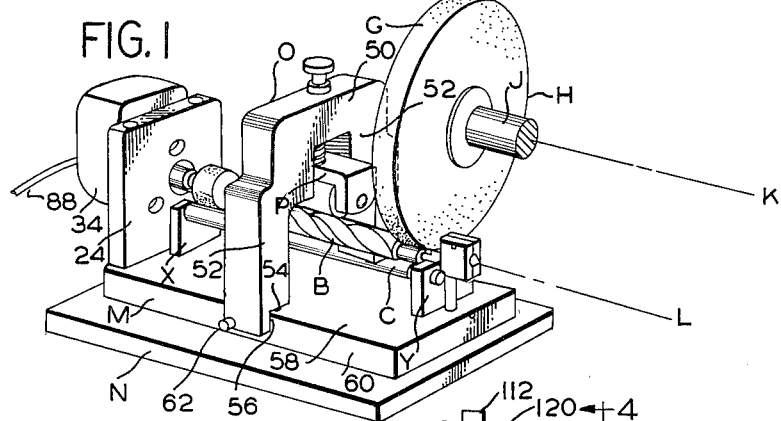
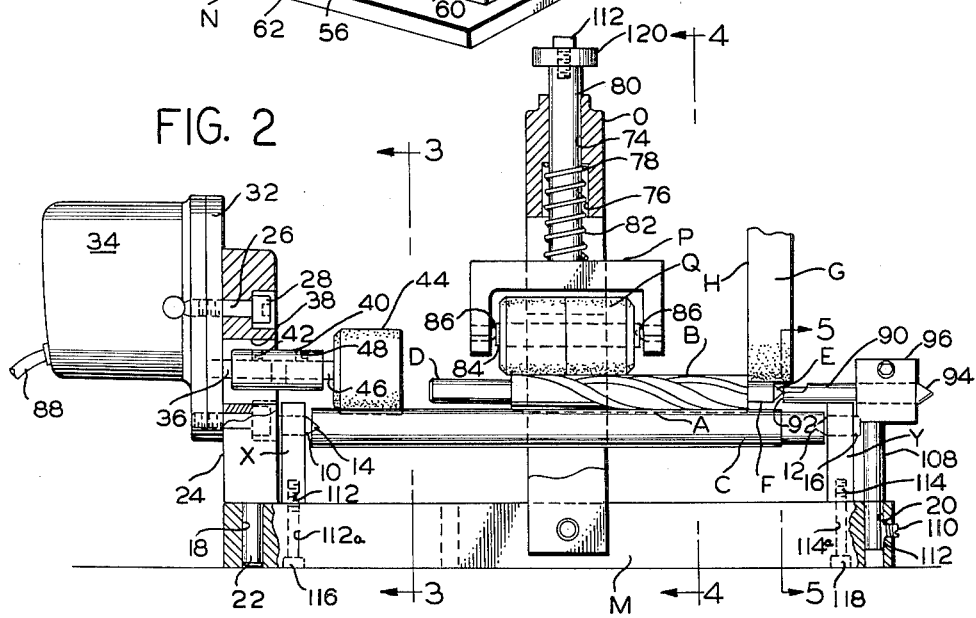
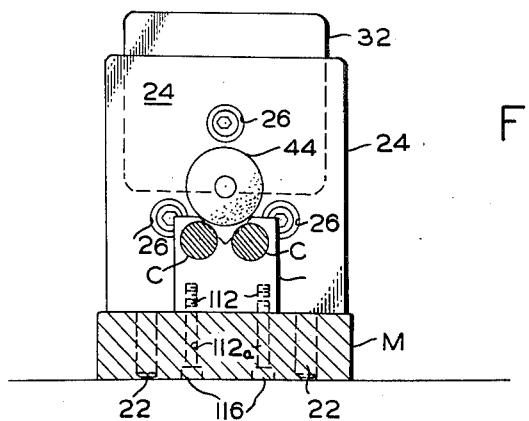
*INVENTOR.*
HERMAN J. MOORE
BY
ATTORNEY Dec. 4, 1962   H. J. MOORE   3,066,457
TOOL GRINDING MACHINE FIXTURE AND METHOD OF USING SAME
Filed July 24, 1961   2 Sheets-Sheet 2
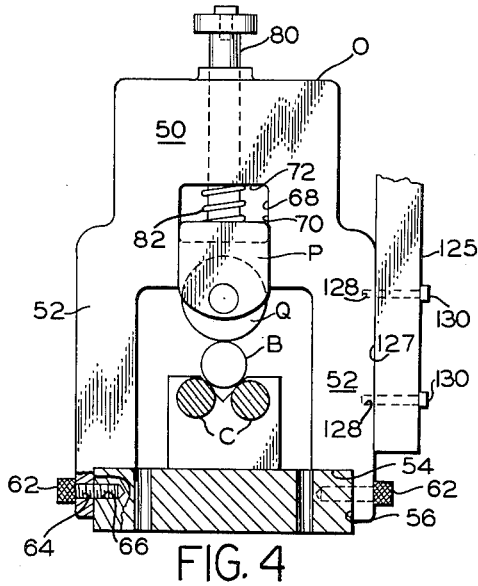
FIG. 4
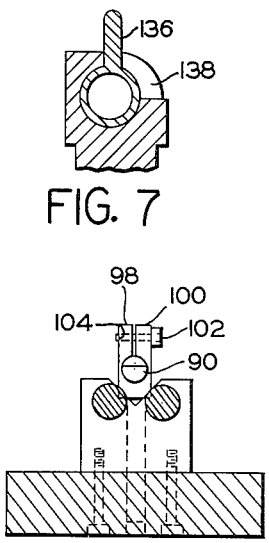
FIG. 7
FIG. 5
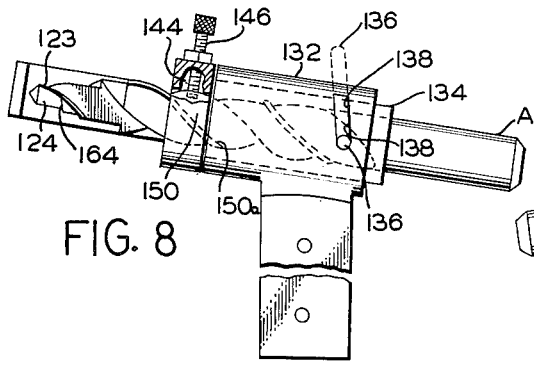
FIG. 8
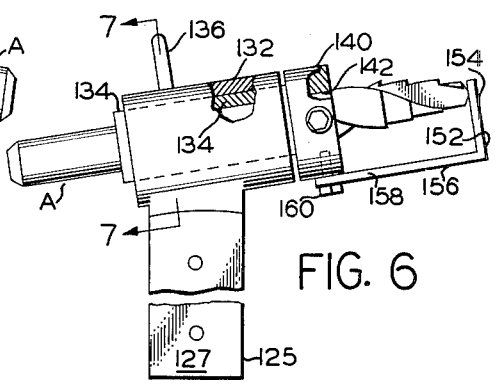
FIG. 6
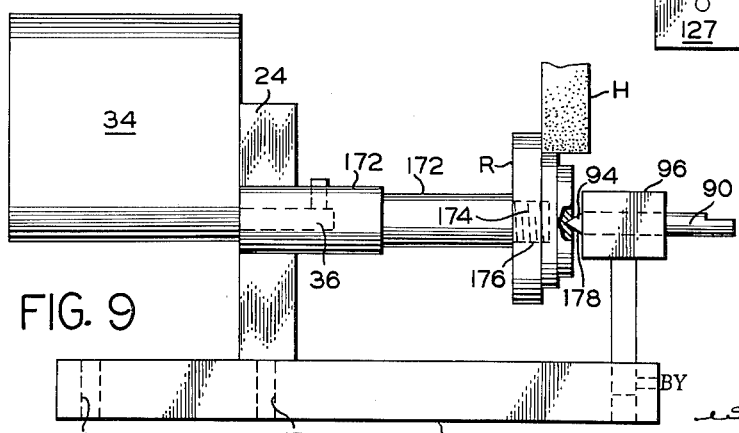
FIG. 9
INVENTOR.
HERMAN J. MOORE
BY
William C. Babcock
ATTORNEY

United States Patent Office 3,066,457
Patented Dec. 4, 1962

3,066,457
TOOL GRINDING MACHINE FIXTURE AND METHOD OF USING SAME
Herman J. Moore, 4424 Camerino, Lakewood, Calif.
Filed July 24, 1961, Ser. No. 128,339
7 Claims. (Cl. 51—237)

The present invention relates generally to the field of grinding, and more particularly to a fixture for so rotatably supporting a tool that a true cylindrical surface can be ground thereon, and a method of using the fixture.

Periodically, such industrial tools as step drills, reamers, circle form tools, and others, require that certain surfaces thereof be reground to a true cylindrical shape. Regrinding of a true cylindrical surface on a tool has, in the past, been most troublesome for tools of any appreciable length tend to deform, as well as vibrate and chatter when brought into contact with a grinding wheel, whereby a frusto-conical uneven surface is ground on the tool, rather than a surface of true cylindrical configuration. Another troublesome aspect of fixtures previously used in supporting tools when surfaces thereof were ground, was the time required in making a machine set-up for grinding the tool and checking to see that the tool was running true as it rotated.

A major object of the present invention is to substantially eliminate the operational disadvantages of fixtures previously used in supporting tools during the time a true cylindrical surface is being reground thereon, and particularly to eliminate the use of such accessories as collets, as well as tools which indicate whether the drill, reamer, or other tool that is being reground, is running true.

A further object of the present invention is to provide a fixture for so rotatably supporting a tool such as a step drill, reamer, or the like, that any deformation of the tool which takes place during the grinding thereof is less than the tolerance that is permitted on the reground surface.

Another object of the invention is to supply a grinding fixture that has an extremely simple mechanical structure, requires a minimum of maintenance attention, and by means of which drills, reamers, and the like, of varying diameter may be reground with but minor adjustment being made to the fixture.

A still further object of the invention is to provide a fixture for use in regrinding a cylindrical surface on step drills, reamers, circle form tools and the like, with a minimum of vibration and chatter being imparted to the tool being ground, which re-working is carried out within but a fraction of the time required heretofore.

A still further object of the invention is to provide a grinding fixture, which when assembled in a first form permits the grinding of true cylindrical surfaces on tools such as step drills and reamers, but which by a rearrangement of the components thereof, the fixture can be transformed to a second form on which such tools as circle form tools can be advantageously ground.

Yet another object of the invention is to provide a fixture that permits the back-off grinding of a step portion of a drill after the step portion has been ground to a true cylindrical configuration.

Another object of the invention is to supply a method by means of which the step portions of a number of drills of the same size may be uniformly reground to the same size and configuration, and then by a back-off grinding operation the leading edge portion may be formed to define a land, with the heel of the step portion having a reduced radius.

These and other objects and advantages of the invention will become apparent from the following description of a preferred form thereof and from the accompanying drawings illustrating the same, in which:

FIGURE 1 is a perspective view of the grinding fixture assembled for use in rotatably supporting a step drill during the time the step portion thereof is being reground to a true cylindrical surface;

FIGURE 2 is a combined side elevational and longitudinal cross-sectional view of the invention shown in FIGURE 1;

FIGURE 3 is a transverse cross-sectional view of the invention taken on line 3—3 of FIGURE 2;

FIGURE 4 is a second transverse cross-sectional view of the invention taken on line 4—4 of FIGURE 2;

FIGURE 5 is a third transverse cross-sectional view of the invention taken on line 5—5 of FIGURE 2;

FIGURE 6 is a side elevational view of an accessory used in back-grinding the step portion of a drill;

FIGURE 7 is a transverse cross-sectional view of the accessory shown in FIGURE 6 taken on line 7—7 thereof;

FIGURE 8 is a side elevational view of the accessory opposite the side shown in FIGURE 6; and, FIGURE 9 is a side elevational view of the invention shown in FIGURE 1 transformed to grind a circle form tool.

Referring now to FIGURES 1 to 5 of the drawings for the general arrangement of the preferred form of the invention, it will be seen that the workpiece A illustrated therein is a step drill, with the cylindrical fluted body B thereof rotatably supported between two identical parallel, laterally spaced rollers C. The step drill includes a shank D and a step portion E. Step portion E is at least partially defined by a cylindrical surface F that is to be reground to a true cylindrical surface as the workpiece A is rotated when the surface E is brought into contact with a flat, circumferentially extending surface G of a power-driven grinding wheel H. Wheel H is rotated by a shaft J that has a longitudinal center line K which is parallel to the center line L of workpiece A when the workpiece is supported between rollers C as shown in FIGURES 1 and 3.

The two rollers C (FIGURE 2) are of substantially greater length than the workpiece A that is to have a true cylindrical surface F ground thereon. Each roller C is rotatably supported by two horizontally disposed stub shafts 10 and 12 that have tapered ends which engage longitudinally aligned recesses 14 and 16 respectively, formed in the ends of the rollers.

A base M is provided that can be removably mounted on a carriage N which can be moved by means (not shown) relative to grinding wheel H. The carriage N is normally a part of the grinder of which wheel H is a part. The particular means by which base M is held in place on carriage N is conventional and hence not shown. Two transversely spaced, vertical bores 18 are formed in one end portion of base M, and a single centrally disposed, vertical bore 20 is formed in the other end thereof. Bores 18 are adapted to be snugly and slidably engaged by two pins 22 that extend downwardly from the flat lower end surface of a vertical plate 24.

A number of spaced, countersunk bores 26 extend through plate 24, in which screws 28 are disposed. The outer ends of screws 28 threadedly engage tapped bores 30 formed in the face plate 32 of an electric motor 34. Through a sequence of gears (not shown) motor 34 drives a shaft 36 at a relatively low speed. Shaft 36 projects from the motor 34 into a large horizontal bore 38 formed in plate 24, as shown in FIGURE 2. A tubular driving collar 40 is removably affixed by a set screw 42 to shaft 36. A resilient driving roller 44, preferably formed of rubber, frictionally contacts adjacent upper surfaces of rollers C, as best seen in FIGURES 2 and 3. The driving roller 44 has a stiff stub shaft 46 projecting therefrom that extends into the outer end portion of the driving collar 40, A second set screw 48 threadedly mounted in collar 40 serves to removably connect the collar to shaft 46.

A vertical, inverted U-shaped member O is shown in FIGURES 1 and 2 that is defined by a horizontal web 50 from which two legs 52 depend. The lower end of each leg 52 is formed to define two flat surfaces 54 and 56 that are in abutting contact with the upper surface 58 of the base M and one of the side walls 60 thereof. Two screws 62 extend through transverse bores 64 formed in the lower portions of legs 52 to engage tapped bores 66 formed in base M (FIGURE 3). For reasons to be explained hereinafter the member O is thus removably supported in a rigid position on base M.

A centrally disposed recess 68 extends upwardly in web 50 that is defined by two parallel side surfaces 70 and a horizontal upper surface 72. A bore 74 extends downwardly through web 50 which is in coaxial alignment with a counterbore 76 of larger diameter that extends upwardly from surface 72. At the junction of bore 74 and counterbore 76 a circular body shoulder 78 is defined.

A yoke P is slidably movable in recess 68, as may best be seen in FIGURES 2 and 4, and serves to rotatably support an elongate resilient pressure roller Q that is capable of rotatably engaging the upper surface of body B when the workpiece A is resting on the rollers C. A rod 80 extends upwardly from yoke P (FIGURE 2), and is slidably mounted in bore 74.

A compressed helical spring 82 encircles a part of rod 80, with the upper end of the spring abutting against body shoulder 78, and the lower end of the spring bearing against yoke P. Spring 82 at all times tends to move yoke P downwardly. Pressure roller Q has a shaft 84 extending therethrough that has recessed ends, and the recessed ends of shaft 84 engage the tapered ends of pins 86 which are supported from yoke P, as may be seen in FIGURE 2. As a result of this construction, pressure roller Q at all times tends to be forced downwardly to contact body B of workpiece A, and maintain the body B in pressure, frictional contact with adjacent upper surfaces of rollers C. When electricity is supplied to motor 34 by conductors 88 from a source (not shown), driving roller 44 is rotated, and frictionally drives the two rollers C. The workpiece A is concurrently driven with rollers C due to being held in frictional contact therewith by the pressure roller Q.

If the carriage N is then moved relative to the grinding wheel H, the tip portion E of the drill may be brought into a position for a true cylindrical surface F to be ground on any desired portion thereof. It will, of course, be apparent that a true cylindrical surface F can only be ground on the workpiece A if the body B of the workpiece is cylindrical, or presents a continuous surface of constant radius to the rollers C as it is rotated by the rollers.

On some drills, the body B will have a back taper. The back taper is usually extremely small, with the diameter of the body B adjacent the shank D being one-thousandth of an inch less than the diameter of the body B adjacent the tip portion. When such a drill has the body B thereof resting on and being rotated by the rollers C, with the tip portion E exposed to the wheel H as shown in FIGURE 1, the surface F ground on the tip portion will not be truly cylindrical but will instead be frusto-conical in shape. However, this deviation of the ground surface F from a true cylindrical to a frusto-conical configuration when the body B has a back taper, is so slight as to have no effect from a practical standpoint, particularly in view of the back-off grinding that is subsequently performed on the drill as will later be described.

Longitudinal movement of the workpiece A relative to the rollers C as the workpiece is rotated by the rollers, is prevented by an elongate stop 90 that has a flat end 92 and a tapered end portion 94. Stop 90 is supported in a horizontal position in a block 96 which is formed with two laterally spaced legs 98 and 100. A screw 102 extends through a transverse bore in one leg to engage a tapped bore 104 formed in the other of the legs. When screw 102 is rotated in an appropriate direction, legs 98 and 100 are drawn towards one another to frictionally grip the stop 90 and hold it in desired longitudinal relationship with the block 96.

A rod 108 extends downwardly from block 96, and is slidably mounted in bore 20, as shown in FIGURE 2. A screw 110 engages a horizontal tapped bore 112 formed in base M. By rotating the screw 110 in an appropriate direction, the inner end of the screw can frictionally engage rod 108 to hold it at a desired elevation relative to base N.

Two end pieces X and Y preferably have tapped recesses 112 and 114 extending upwardly therein. Screws 116 and 118 extend upwardly through bores 112a and 114a respectively, formed in base M to engage the tapped recesses 112 and 114, and removably hold the end pieces X and Y in place on base M (FIGURE 2). A circular handle 120 is mounted on the upper end of rod 80 and can be affixed hereto by a screw 122. If desired, the rod 80 and handle 120 can be formed as an integral unit.

In FIGURES 6, 7 and 8 an apparatus is shown that permits steps on the tip portion E of a drill which have been ground to cylindrical surfaces F, to have lands 123 ground on the leading edges thereof, and the heel portion 124 of each step ground to have a radius less than that of the land thereon.

The apparatus shown in FIGURES 6–8 includes an upright 125 that has a flat longitudinally extending inner surface 127 which can abut against the exterior surface of the left one of the legs 52 as illustrated in FIGURE 4. Two bores are formed in upright 125 which extend transversely therethrough and are aligned with tapped recesses 128 formed in the leg 52 against which the upright abuts. Two screws 130 extend through the bores in upright 125 to engage recesses 128 and maintain the upright in a fixed position on the leg 52 against which it abuts. An angularly disposed tubular head 132 is supported on the upper end of upright 125. A cylindrical shell 134 is rotatably and slidably movable in head 132. A handle 136 in the form of a rod projects outwardly from shell 134 through a slot 138 formed in head 132. Slot 138 extends transversely in the head 132 through approximately 90°, as can best be seen in FIGURE 7. Slot 138 also extends upwardly and forwardly, as shown in FIGURE 8.

The shell 134 is of such interior cross section that a drill (workpiece) A can be snugly and slidably inserted therein. If the cross section of drill A is smaller than that of the interior cross section of shell 134, a tubular insert (not shown) can be placed in the shell to adapt it for use with the drill of smaller cross section. A block 140 is affixed to the forward end of shell 134, and a bore 142 extends through block 140 that is in coaxial alignment with the bore in shell 134. A tapped bore 144 in block 140 is threadedly engaged by a screw 146, which screw extends into the confines of the bore 144. Screw 146 is held at a fixed position relative to block 140 by a lock nut 148. The transverse cross section of screw 146 is substantially less than the width of the flute 150 of the drill A into which it extends.

An L-shaped stop member 152 includes a leg 154 and a longer leg 156. A longitudinally extending slot 158 is formed in leg 156 through which a screw 160 extends to engage a tapped recess in block 140. By tightening screw 160 the stop member 152 may be so disposed to prevent the drill A from moving beyond block 140 greater than a fixed distance.

When a drill A is disposed as shown in FIGURE 8, and the land 123 on the outer step is brought into grinding contact with a portion of the grinding wheel H, the center line L is in the same horizontal plane as centerline K. After the land 123 is reground, the drill A is rotated in a clockwise manner as shown by the arrow in FIGURE 8 until the screw 146 contacts the edge 150a of flute 150. This rotation causes the heel of the most outwardly disposed step to be back-ground to a radius less than that of the land 123.

The handle 136 is then rotated from the position shown in solid line to that shown in phantom line in FIGURE 8, and this rotation of the handle concurrently rotates and slides the drill forwardly so the grinding wheel H will grind the taper 164 to the desired angulation. The same operation is subsequently performed on the balance of the steps of drill A (FIGURES 6 and 8).

Should it be desired to grind a full circle tool R, the apparatus shown in FIGURE 9 may be used. The inverted U-shaped member O is removed from base M, and the pins 22 of plate 24 caused to engage a pair of bores 170 formed in the base. An arbor 172 is removably connected to drive shaft 36. Arbor 172 has a threaded forward end portion 174 that engages a tapped bore 176 in tool R. The tool R has a tapered recess 178 formed therein that is engaged by the tapered end 94 of stop 98, and the stop is held in block 96.

Rod 108 is so vertically adjusted as to so dispose the stop 98 that the longitudinal axis thereof is in coaxial alignment with the axis of rotation of driving shaft 36. By electrically energizing the motor 34, the tool R can be rotated to have a cylindrical surface ground thereon by grinding wheel H.

The operation of the invention has been previously described in detail and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. An apparatus for use in so rotatably supporting a step drill relative to a driven grinding wheel which rotates on a fixed axis that a step portion of said drill forwardly of a fluted body of said drill can be ground to a true cylindrical surface as a carriage operatively associated with said wheel is moved towards the same, comprising: an elongate base capable of being rigidly mounted on said carriage with the longitudinal axis thereof parallel with the axis of rotation of said wheel; two parallel, elongate laterally spaced cylindrical rollers disposed above said base with the longitudinal axis thereof parallel to said longitudinal axis of said base and with the lateral spacing betwen said rollers being substantially less than the diameter of said fluted body, said rollers being capable of rotatably supporting said fluted body therebetween; means extending upwardly from said base for rotatably supporting said rollers at fixed positions relative thereto; a resilient frictional driving roller that concurrently pressure contacts adjacent surface portions of said rollers for concurrently rotating said rollers in opposite directions; means for driving said resilient roller; means for holding said fluted body in frictional pressure contact with said rollers for said step drill to be rotated as said rollers are driven; and stop means for maintaining said step drill at a fixed longitudinal position relative to said rollers for said stepped portion to be ground to a true cylindrical surface as said carriage is moved towards said grinding wheel.

2. An apparatus as defined in claim 1 wherein said means extending upwardly from said base includes two longitudinally spaced end pieces, and each roller is provided with two coaxially aligned shafts that are supported from said end pieces, said shafts being formed with inwardly disposed tapered ends that engage tapered recesses formed in said rollers for rotatably supporting said rollers.

3. An apparatus as defined in claim 2 wherein said means for driving said resilient roller is an electric motor.

4. An apparatus as defined in claim 3 which in addition includes a rigid stub shaft that extends from said resilient roller, a rigid driving shaft extending from said motor, a mounting block to which said motor is affixed, said block having a bore formed therein through which said driving shaft projects, means for removably affixing said mounting block to said base, and a rigid tubular connector that connects said driving shaft and said stub shaft.

5. An apparatus as defined in claim 4 wherein said base has a plurality of pairs of vertically spaced bores therein, and said means for removably affixing said mounting block to said base includes a pair of pins that extend downwardly from said block and are capable of slidably engaging any one of said pairs of bores to hold said mounting block at a desired longitudinal position on said base.

6. An apparatus as defined in claim 4 wherein said means for holding said fluted body in frictional pressure contact with said rollers include: a resilient elongate pressure roller; a shaft on which said roller is rotatably mounted; a yoke that engages the ends of said shaft; a rod that extends upwardly from said yoke; a U-shaped member having a horizontal web and two legs that extend downwardly therefrom, said U-shaped member being transversely disposed relative to said base, with the lower end portions of said legs in abutting contact with said base, and said web having a vertical bore therein in which said rod is slidably mounted; a helical compressed spring that encircles said rod, with the upper end of said spring in contact with the under side of said web, and the lower end of said spring bearing against said yoke to force said pressure roller downwardly; and means for removably connecting said lower ends of said legs to said base.

7. An apparatus as defined in claim 4 wherein said stop includes: a rod having a lower end portion which is adjustably movable in a vertical bore in said base, said rod and vertical bore having the longitudinal axis thereof in the same vertical plane as the longitudinal axis of said driving shaft, and said base having a tapped bore formed therein that is in communication with said vertical bore; a set screw that threadedly engages said tapped bore and has an inwardly disposed end that frictionally engages said rod in said vertical bore to hold said vertical rod at a desired elevation relative to said base; clamp means rigidly affixed to the upper end of said vertical rod; and a stop member adjustably supported in said clamp means for horizontal adjustment relative to said base.

References Cited in the file of this patent
UNITED STATES PATENTS

| | | |
|---|---|---|
| 1,452,508 | Hervig | Apr. 24, 1923 |
| 1,779,618 | Phelps | Oct. 28, 1930 |
| 2,411,972 | Melin | Dec. 3, 1946 |
| 2,727,337 | Gross | Dec. 20, 1955 |
| 2,775,077 | Whittenberg | Dec. 25, 1956 |